(12) United States Patent
Miyata et al.

(10) Patent No.: US 9,373,849 B2
(45) Date of Patent: Jun. 21, 2016

(54) CARBON CATALYST, METHOD FOR PRODUCING CARBON CATALYST, FUEL CELL, ELECTRICITY STORAGE DEVICE, AND USE OF CARBON CATALYST

(71) Applicants: Seizo Miyata, Tokyo (JP); Masaharu Oshima, Tokyo (JP); Jun-ichi Ozaki, Kiryu (JP); Kazuo Saito, Chiba (JP); Shogo Moriya, Chiba (JP); Kyosuke Iida, Chiba (JP); Takeaki Kishimoto, Chiba (JP)

(72) Inventors: Seizo Miyata, Tokyo (JP); Masaharu Oshima, Tokyo (JP); Jun-ichi Ozaki, Kiryu (JP); Kazuo Saito, Chiba (JP); Shogo Moriya, Chiba (JP); Kyosuke Iida, Chiba (JP); Takeaki Kishimoto, Chiba (JP)

(73) Assignees: National University Corporation Gunma University, Maebashi-shi (JP); Nisshinbo Holdings, Inc., Tokyo (JP); Seizo Miyata, Nishitokyo-shi (JP); Masaharu Oshima, Tokyo (JP)

( * ) Notice: Subject to any disclaimer, the term of this patent is extended or adjusted under 35 U.S.C. 154(b) by 378 days.

(21) Appl. No.: 13/931,073

(22) Filed: Jun. 28, 2013

(65) Prior Publication Data

US 2013/0288888 A1    Oct. 31, 2013

Related U.S. Application Data

(62) Division of application No. 12/996,245, filed as application No. PCT/JP2009/060245 on Jun. 4, 2009, now abandoned.

(30) Foreign Application Priority Data

Jun. 4, 2008 (JP) ................................. 2008-147399

(51) Int. Cl.
*H01M 4/86* (2006.01)
*C01B 31/02* (2006.01)

(Continued)

(52) U.S. Cl.
CPC ............. *H01M 4/8652* (2013.01); *C01B 31/02* (2013.01); *H01G 11/34* (2013.01); *H01G 11/38* (2013.01);

(Continued)

(58) Field of Classification Search
None
See application file for complete search history.

(56) References Cited

U.S. PATENT DOCUMENTS 3,755,193 A    8/1973   Luft et al.
4,816,289 A *  3/1989   Komatsu ................. D01F 11/12
                                                              252/502

(Continued)

FOREIGN PATENT DOCUMENTS

JP    47 021388    10/1972
JP    2004 330181  11/2004

(Continued)

OTHER PUBLICATIONS

Extended European Search Report issued Apr. 7, 2014 in Patent Application No. 09758382.7.

(Continued)

*Primary Examiner* — Guinever S Gregorio
(74) *Attorney, Agent, or Firm* — Oblon, McClelland, Maier & Neustadt, L.L.P.

(57) ABSTRACT

A carbon catalyst which has high catalytic activity and can achieve high catalyst performance is provided. The carbon catalyst comprises nitrogen. The energy peak area ratio of the first nitrogen atom whose electron in the 1s orbital has a binding energy of 398.5±1.0 eV to the second nitrogen atom whose electron in the 1s orbital has a binding energy of 401±1.0 eV (i.e., the value of (the first nitrogen atom)/(the second nitrogen atom)) of the nitrogen introduced into the catalyst is 1.2 or less.

3 Claims, 3 Drawing Sheets

(51) Int. Cl.
*H01G 9/26* (2006.01)
*H01G 11/38* (2013.01)
*H01M 4/587* (2010.01)
*H01M 4/88* (2006.01)
*H01M 4/90* (2006.01)
*H01M 4/96* (2006.01)
*H01M 8/1018* (2016.01)
*H01G 11/34* (2013.01)
*H01M 8/10* (2016.01)

(52) U.S. Cl.
CPC .............. *H01M 4/8882* (2013.01); *H01M 4/90* (2013.01); *H01M 4/9083* (2013.01); *H01M 4/96* (2013.01); *H01M 4/587* (2013.01); *H01M 2008/1095* (2013.01); *Y02E 60/13* (2013.01); *Y02E 60/50* (2013.01)

(56) References Cited

U.S. PATENT DOCUMENTS

| | | | |
|---|---|---|---|
| 6,689,711 | B2 | 2/2004 | Lefebvre |
| 2003/0069129 | A1 | 4/2003 | Lefebvre |
| 2006/0263674 | A1 | 11/2006 | Hosoya et al. |
| 2007/0059233 | A1* | 3/2007 | Sheem ............... B01J 20/20 423/445 R |
| 2008/0287607 | A1* | 11/2008 | Tai Chen ............ C08L 33/20 525/204 |
| 2010/0323272 | A1 | 12/2010 | Ozaki et al. |

FOREIGN PATENT DOCUMENTS

| | | |
|---|---|---|
| JP | 2004-362802 A | 12/2004 |
| JP | 2006 331846 | 12/2006 |
| JP | 2007 207662 | 8/2007 |
| WO | WO 2004/112174 A1 | 12/2004 |
| WO | WO 2009/098812 A1 | 8/2009 |

OTHER PUBLICATIONS

Office Action issued on Dec. 16, 2014 in the corresponding Japanese Patent Application No. 2013-244139 (with English Translation).

Wu, G., et al., "Well-dispersed High-Loading Pt Nanoparticles Supported by Shell-Core Nanostructured Carbon for Methanol Electrooxidation," Langmuir, vol. 24, No. 7, pp. 3566-3575, Feb. 23, 2008.

Choi, B., et al., "Highly dispersed Pt nanoparticles on nitrogen-doped magnetic carbon nanoparticles and their enhanced activity for methanol oxidation," Carbon, vol. 45, pp. 2496-2501, Sep. 1, 2007.

Kobayashi, R., et al., "Preparation of cathode catalyst carbons for PEFC by using polymer metal complexes," The Electrochemical Society of Japan Dai 75 Kai Taikai Koen Yoshishu, p. 455, Mar. 29, 2008 (with English Translation).

International Search Report issued Aug. 25, 2009 in PCT/JP09/060245 filed Jun. 4, 2009.

Matter et al., "The role of nanostructure in nitrogen-containing carbon catalysts for the oxygen reduction reaction", J. of Catalysis 239 (2006), pp. 83-96.

Wang et al., "Effect of the Pre-Treatment of Carbon Black Supports on the Activity of Fe-Based Electrocatalysts of the Reduction of Oxygen", J. Phys. Chem B 1999, 103, pp. 2042-2049.

Pels et al., "Evolution of Nitrogen Functionalities in Carbonaceous Materials During Pyrolysis", Carbon (1995), vol. 33, No. 11, pp. 1641-1654.

Lahaye et al., "Porous structure and suface chemistry of nitrogen containing carbons from polymers", Carbon 37 (1999), pp. 585-590.

Maldonado et al., "Structure, compoition, and chemical reactivity of carbon nanotubes by selective nitrogen doping", Carbon 44 (2006), pp. 1429-1437.

* cited by examiner

CARBON CATALYST, METHOD FOR PRODUCING CARBON CATALYST, FUEL CELL, ELECTRICITY STORAGE DEVICE, AND USE OF CARBON CATALYST

This application is a divisional of U.S. patent application Ser. No. 12/996,245 filed on Dec. 3, 2010, the entire content of which is incorporated herein by reference, and which is a 35 U.S.C. §371 national stage patent application of international patent application PCT/JP09/060,245, filed Jun. 4, 2009, which claims priority to Japanese patent application JP 2008-147399, filed Jun. 4, 2008.

TECHNICAL FIELD

The present invention relates to a carbon catalyst and a method for producing the carbon catalyst.

Further, the present invention relates to a fuel cell using the carbon catalyst, an electricity storage device using the carbon catalyst, and use of the carbon catalyst.

BACKGROUND ART

Currently, a large amount of noble metal catalysts such as platinum catalyst and the like are being used for industrial activities.

Particularly, a large amount of platinum catalyst is needed to produce a fuel cell, and due to the high cost of the platinum catalyst, the fuel cell is prevented from being widely used.

Therefore, efforts are being made to develop techniques for forming a catalyst without using platinum.

Among the catalysts for the fuel cell, a carbon material containing nitrogen has long been studied, focusing on its activity for oxygen reduction reaction (see, for example, Patent Documents 1 to 4).

PRIOR ART DOCUMENTS

Patent Documents

[Patent Document 1] Japanese Unexamined Patent Application Publication No. 47-21388
[Patent Document 2] Japanese Unexamined Patent Application Publication No. 2004-330181
[Patent Document 3] Japanese Unexamined Patent Application Publication No. 2006-331846
[Patent Document 4] Japanese Unexamined Patent Application Publication No. 2007-207662

DISCLOSURE OF THE INVENTION

Problems to be Solved by the Invention

It is disclosed in Patent Documents 1 to 4 that nitrogen-containing carbon material has activity for oxygen reduction reaction. However, in order to realize practical use of such material, the material must have high catalytic activity.

Thus, the content of nitrogen has also been considered in the documents, however, a material with sufficient high catalytic activity has not been achieved.

Further, presence of a nitrogen atom whose electron in the 1s orbital has a binding energy of 398.5±0.5 eV and a nitrogen atom whose electron in the 1s orbital has a binding energy of 401±0.5 eV has been mentioned in Patent Document 2, however, since abundance ratio of the both nitrogen atoms has not been specified, it is impossible to obtain a catalyst with high performance.

Thus, there is a desire to obtain a configuration to achieve a high catalyst performance using a carbon material.

To solve the above problems, the present invention is directed to provide a carbon catalyst with sufficiently high catalytic activity and high catalyst performance, and a method for producing the carbon catalyst.

Further, the present invention is also directed to provide a fuel cell using the carbon catalyst, an electricity storage device using the carbon catalyst, and use of the carbon catalyst.

Means for Solving the Problems

A carbon catalyst according to an aspect of the present invention is a carbon catalyst having nitrogen introduced therein, wherein the value of energy peak area ratio of a first nitrogen atom whose electron in the 1s orbital has a binding energy of 398.5±1.0 eV to a second nitrogen atom whose electron in the 1s orbital has a binding energy of 401±1.0 eV (i.e., the value of (the first nitrogen atom)/(the second nitrogen atom)) of the introduced nitrogen is 1.2 or less.

In the carbon catalyst according to the aforesaid aspect of the present invention, the first nitrogen atom is of a pyridine-type; and the second nitrogen atom is of a pyrrole-type, a pyridine-type, or a graphene-substituted-type.

Further, there is a possible configuration in which the content of the nitrogen atoms on the surface of the catalyst is within a range of 0.01 to 0.3 by atomic ratio, with respect to the carbon atoms on the surface.

Further, there are a possible configuration in which the carbon catalyst contains a metal or a metal compound, and a possible configuration in which the carbon catalyst contains a transition metal or a transition metal compound.

A first method for producing a carbon catalyst according to another aspect of the present invention comprises the steps of: preparing a nitrogen-containing carbon precursor polymer; and carbonizing the carbon precursor polymer.

A second method for producing a carbon catalyst according to further another aspect of the present invention comprises the steps of: preparing a carbon precursor polymer; carbonizing the carbon precursor polymer; and adding nitrogen into the carbonized carbon precursor polymer.

Incidentally, by combining the first method for producing the carbon catalyst and the second method for producing the carbon catalyst according to the present invention, it is possible to prepare a nitrogen-containing carbon precursor polymer and, after carbonization, add nitrogen into the carbonized carbon precursor polymer.

In the first method for producing the carbon catalyst and the second method for producing the carbon catalyst according to the present invention, it is possible to prepare a metal atom-containing carbon precursor polymer in the step of preparing the carbon precursor polymer.

Further, it is possible to mix a metal or a metal compound into the carbon precursor polymer after the step of preparing the carbon precursor polymer, and carbonize the mixture of the metal or the metal compound and the carbon precursor polymer.

Further, it is possible to mix a transition metal or a transition metal compound into the carbon precursor polymer after the step of preparing the carbon precursor polymer, and carbonize the mixture of the transition metal or the transition metal compound and the carbon precursor polymer.

Further, it is possible to perform the carbonization at a temperature of 300° C. to 1500° C.

A fuel cell according to further another aspect of the present invention comprises: a solid electrolyte; and a pair of electrodes facing each other with the solid electrolyte interposed therebetween, wherein at least one of the pair of electrodes includes the carbon catalyst according to the present invention.

An electricity storage device according to further another aspect of the present invention comprises: an electrode material; and an electrolyte, wherein the electrode material includes the carbon catalyst according to the present invention.

In a use of carbon catalyst according to further another aspect of the present invention, the carbon catalyst according to the present invention is used to accelerate chemical reactions due to the catalytic action of the carbon catalyst.

Advantages of the Invention

With the carbon catalyst of the present invention, energy peak area ratio of the first nitrogen atom and the second nitrogen atom whose electron in the 1s orbital has a binding energy of 401±1.0 eV (i.e., the value of (first nitrogen atom)/(second nitrogen atom)) is 1.2 or lower, and thereby a carbon catalyst having high activity can be achieved.

With the first method for producing the carbon catalyst according to the present invention, since a nitrogen-containing carbon precursor polymer is prepared and the carbon precursor polymer is carbonized, it is possible to produce a nitrogen-introduced carbon catalyst having high activity.

With the second method for producing the carbon catalyst according to the present invention, since the step of adding nitrogen to the carbonized carbon precursor polymer is provided, it is possible to produce a nitrogen-introduced carbon catalyst having high activity.

Further, with the carbon catalyst of the present invention, since a carbon catalyst having high activity can be achieved, it is possible to improve chemical reactions such as oxidation-reduction reactions using a low-cost carbon catalyst widely available in nature, instead of using a high-priced noble metal catalyst such as platinum catalyst, which has limited reserve in nature.

Further, it is possible to make use of low-quality petrified resource. For example, by applying the present invention to introduce nitrogen into low-value coal, of the extracted coal, the coal can be utilized as carbon catalyst.

With the fuel cell of the present invention and the electricity storage device of the present invention, since the carbon catalyst of the present invention is used as electrode catalyst and electrode material, it is possible to achieve a fuel cell and electricity storage device with high performance with relatively low cost.

BEST MODES FOR CARRYING OUT THE INVENTION

A carbon catalyst according to the present invention is a carbon catalyst having nitrogen introduced therein.

Further, the value of energy peak area ratio of a first nitrogen atom whose electron in the 1s orbital has a binding energy of 398.5±1.0 eV to a second nitrogen atom whose electron in the 1s orbital has a binding energy of 401±1.0 eV (i.e., the value of (first nitrogen atom)/(second nitrogen atom)) of the introduced nitrogen is 1.2 or less.

In the carbon catalyst of the present invention, there exists graphene which is an aggregation of carbon atoms bonded together through $sp^2$-hybridized orbitals to form a two-dimensional hexagonal network structure.

Further, when nitrogen atoms are introduced into the hexagonal network structure, the nitrogen atom has a pyrrole-type structure, a graphene-substituted-type structure, a pyridine-type structure, or a pyridone-type structure, and thereby the carbon catalyst exhibits catalytic activity.

The pyrrole-type structure is formed when the hexagonal shape of the graphene changes into a pentagonal shape containing nitrogen atom.

The graphene-substituted-type structure is formed when a carbon atom in the boundary of bordering hexagonal shapes of the graphene network is substituted by a nitrogen atom, wherein the nitrogen atom is bonded with three carbon atoms.

The pyridine-type structure is formed when a carbon atom not in the boundary of hexagonal shapes of the graphene network (mainly in the periphery of a molecule) is substituted by a nitrogen atom, wherein the nitrogen atom is bonded with two carbon atoms to configure a hexagonal shape.

The pyridone-type structure is formed when a nitrogen atom is bonded with two carbon atoms to configure a hexagonal shape, and an OH group or O is bonded with one of the two carbon atoms bonded with the nitrogen atom.

The pyridine-type is included as the first nitrogen atom whose electron in the 1s orbital has a binding energy of 398.5±1.0 eV.

Further, the pyrrole-type, the graphene-substituted-type, and the pyridine-type are included as the second nitrogen atom whose electron in the 1s orbital has a binding energy of 401±1.0 eV.

The energy peak area ratio can be calculated by measuring the quantitative ratio of the respective binding energies by XPS (X-ray photoelectron spectroscopy).

Further, the carbon catalyst exhibits high activity when the value of (first nitrogen atom)/(second nitrogen atom) is 1.2 or less. It is more preferred that the value of (first nitrogen atom)/(second nitrogen atom) is 1.1 or less. The activity of the carbon catalyst will be remarkably reduced if the value of (first nitrogen atom)/(second nitrogen atom) exceeds 1.2.

This feature will be described in more detail below with reference to FIG. 1A, FIG. 1B and FIG. 2.

Figure 1A:
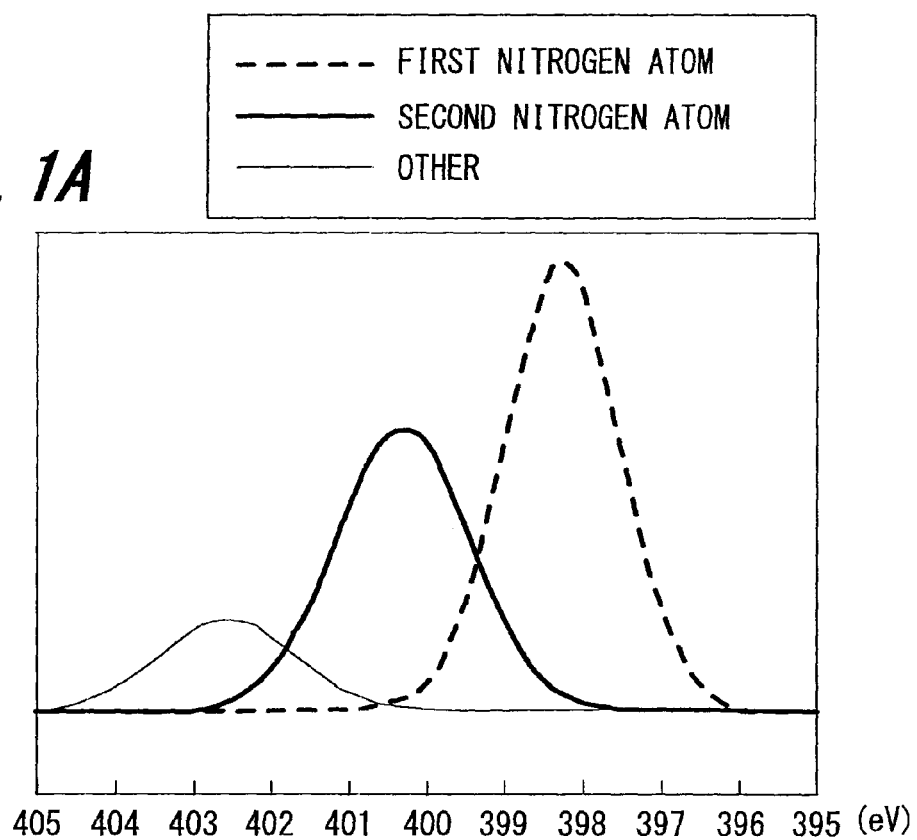
FIG. 1A and FIG. 1B each show an X-ray photoelectron spectrum of binding energy of an electron in the 1s orbital of a nitrogen atom introduced into a carbon catalyst.
Figure 1B:
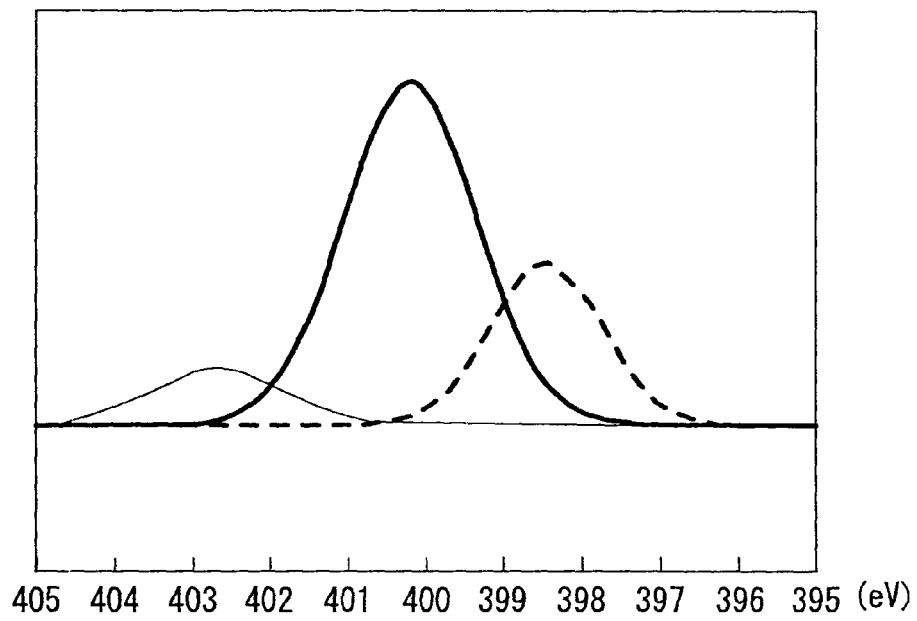

FIG. 1A and FIG. 1B each show a spectrum of the binding energy of an electron in the 1s orbital of a nitrogen atom of the carbon catalyst having nitrogen introduced therein, the spectrum being obtained by performing XPS measurement.

FIG. 1A shows a case of a carbon catalyst having low activity (i.e., a carbon catalyst having nitrogen atom introduced therein according to a prior art), and FIG. 1B shows a case of a carbon catalyst having high activity (i.e., a carbon catalyst according to the present invention).

In the present invention, the nitrogen atom whose electron in the 1s orbital has a binding energy of 398.5±1.0 eV is referred to as a "first nitrogen atom", and the nitrogen atom whose electron in the 1s orbital has a binding energy of 401±1.0 eV is referred to as a "second nitrogen atom".

The first nitrogen atom is indicated by a thick broken line mainly shown in FIG. 1A and FIG. 1B.

Further, the second nitrogen atom is indicated by a thick solid line mainly shown in FIG. 1A and FIG. 1B.

Incidentally, another peak appearing in the vicinity of 402.7 eV is indicated by a thin solid line.

As is known by comparing FIG. 1A with FIG. 1B that, in the case of a carbon catalyst having low activity, the number of the first nitrogen atoms is somewhat large; while in the case of a carbon catalyst having high activity, the number of the first nitrogen atoms becomes small, i.e., (first nitrogen atom)/(second nitrogen atom) becomes small.

Figure 2:
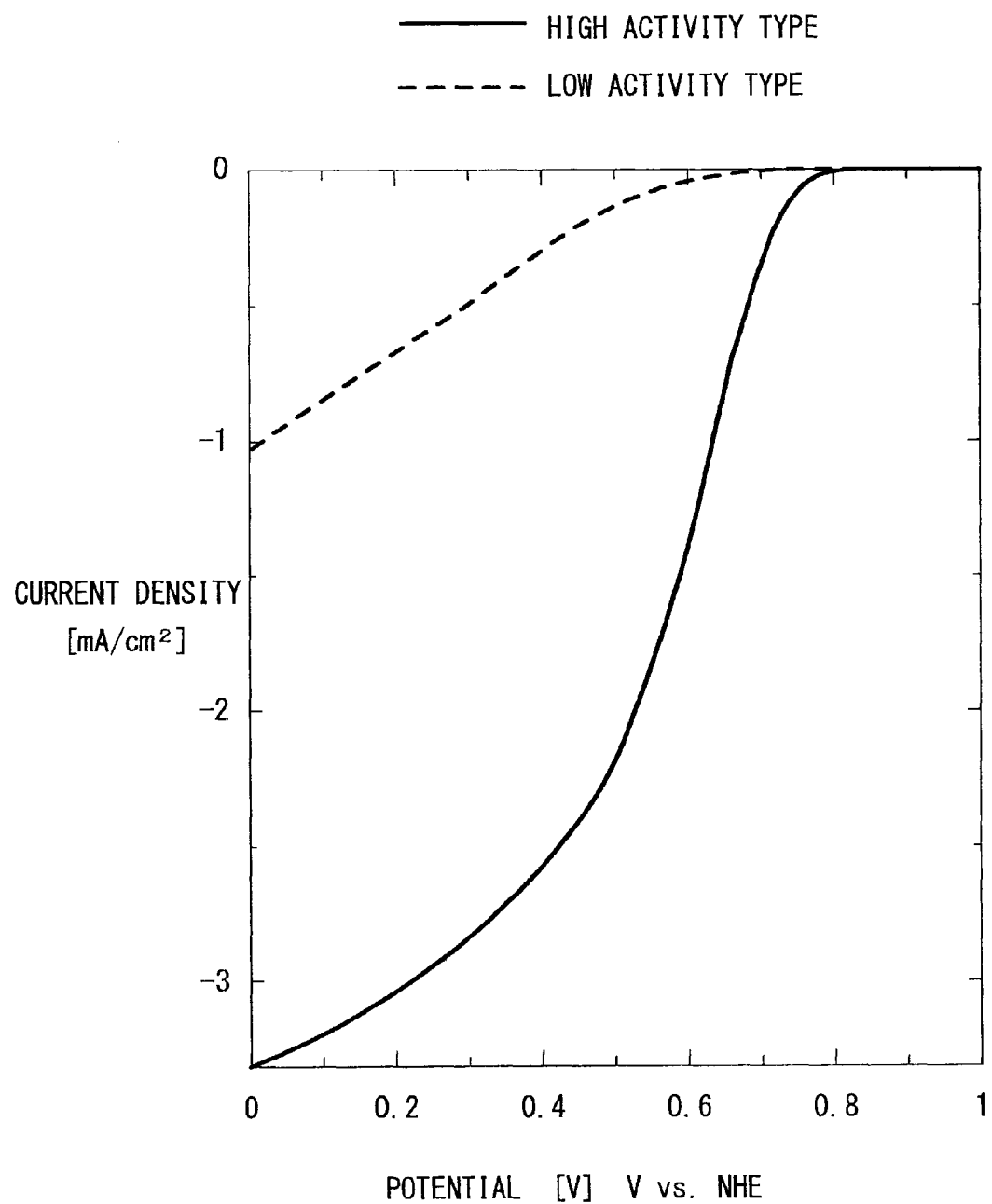
FIG. 2 is a graph for comparing activity for oxygen reduction reaction of the carbon catalyst whose spectrum is shown in FIG. 1A and FIG. 1B.

Next, the result of the measurement of the activity for oxygen reduction reaction performed respectively on the carbon catalyst shown in FIG. 1A and the carbon catalyst shown in FIG. 1B is shown in FIG. 2. The vertical axis of FIG. 2 represents current density, and the horizontal axis represents potential V with respect to the normal hydrogen electrode NHE.

It can be known from FIG. 2 that, in the case of the high activity type, the variation of the current density caused by the variation of the potential is larger, and the activity for oxygen reduction reaction is larger, compared with the case of the low activity type.

Incidentally, in the case where almost all nitrogen atoms are the second nitrogen atoms and almost no first nitrogen atom exists, the value of (first nitrogen atom)/(second nitrogen atom) will be close to zero, and it is considered that high activity may also be obtained in such case.

The carbon catalyst according to the present invention also includes the aforesaid case where almost all nitrogen atoms are the second nitrogen atoms.

Further, it is preferred that, in the carbon catalyst of the present invention, the content of the nitrogen atoms on the surface of the carbon catalyst is within a range of 0.01 to 0.3 by atomic ratio, with respect to the carbon atoms on the surface. If the content of the nitrogen atoms is 0.01 or lower, the catalytic activity will be low; and if the content of the nitrogen atoms is 0.3 or higher, the catalytic activity will also be low.

The carbon catalyst of the present invention may contain a metal or a metal compound. The kind of metal is not particularly limited as long as it does not inhibit activity of the carbon catalyst, however it is preferred that the metal is a transition metal, and it is more preferred that the metal is an element belonging to the third to twelfth groups in the fourth period of the periodic table. Examples of such transition metal include cobalt (Co), iron (Fe), manganese (Mn), nickel (Ni), copper (Cu), titanium (Ti), chromium (Cr), zinc (Zn), zirconium (Zr), tantalum (Ta), and the like.

Incidentally, in the present invention, in addition to the transition metal, other element (such as boron B) may also be contained as long as the aforesaid as long as the element falls within the aforesaid scope.

The carbon catalyst of the present invention can be produced by introducing nitrogen and carbonizing a carbon precursor polymer.

Nitrogen may be introduced by any one of the following methods: using a carbon precursor polymer which contains nitrogen atom(s) as a constituent element; adding a carbon precursor polymer which contains nitrogen atom(s) as a constituent element into a carbon precursor polymer which contains no nitrogen atom; and introducing nitrogen atom(s) after carbonization.

Further, Nitrogen may also be introduced by using a plurality of methods for introducing nitrogen in combination.

A carbon catalyst containing high concentration of nitrogen atoms can be obtained by producing the carbon catalyst in the aforesaid manner.

As described above, it is preferred that the content of the nitrogen atoms on the surface of the formed carbon catalyst is within a range of 0.01 to 0.3 by atomic ratio, with respect to the carbon atoms on the surface. If the content of the nitrogen atoms is 0.01 or lower, the catalytic activity will be low; and if the content of the nitrogen atoms is 0.3 or higher, the catalytic activity will also be low.

Examples of the methods for measuring atom-content on the surface include XPS (X-ray photoelectron spectroscopy) and the like.

Method for producing the carbon catalyst according to the present invention will be described in detail below.

First, the material of the carbon precursor polymer for producing the carbon catalyst is not particularly limited as long as the material is a polymer material capable of being carbonized by heat curing.

For example, the following materials may be used as the carbon precursor polymer: polyacrylonitrile, chelating resin, cellulose, carboxymethyl cellulose, polyvinyl alcohol, polyacrylic acid, polyfurfuryl alcohol, fran resin, phenol resin, phenol-formaldehyde resin, polyimidazol, melamine resin, pitch, brown coal, polyvinylidene chloride, polycarbodiimide, lignin, coal, biomass, protein, humic acid, polyimide, polyaniline, polypyrrole, polybenzimidazole, polyamide, polyamide-imide and the like.

Incidentally, the carbon precursor polymer may contain metal atoms as long as the carbon precursor polymer is a polymer material capable of being carbonized by heat curing.

For example, the carbon precursor polymer may be a nitrogen-containing ligand polymer, metal coordination compound and the like.

Further, the carbon precursor polymer suitable to produce the carbon catalyst of the present invention may be prepared even from a polymer material unsuitable to be carbonized if such polymer material is mixed or copolymerized with a polymer material which prompts cross-linking.

Further, a carbon precursor compound containing nitrogen atom(s) as a constituent element may be added, and such carbon precursor compound is not particularly limited as long as it can be carbonized.

For example, the following materials may be used as such carbon precursor compound: acrylonitrile, acrylamide, methacrylamide, melamine, pyridine, urea, amino acid, imidazole, pyrrole, indole, quinoline, quinoxaline, acridine, pyridazine, cinnoline, oxazole, morpholine, carbodiimide and the like.

Furthermore, a metal or a metal compound may be mixed into the carbon precursor polymer. The metal is not particularly limited as long as it does not inhibit activity of the carbon catalyst, however it is preferred that the metal is a transition metal, and it is more preferred that the metal is an element belonging to the third to twelfth groups in the fourth period of the periodic table. Examples of such transition metal include cobalt (Co), iron (Fe), manganese (Mn), nickel (Ni), copper (Cu), titanium (Ti), chromium (Cr), zinc (Zn), zirconium (Zr), tantalum (Ta), and the like.

Further, a salt, a hydroxide, an oxide, a nitride, a sulfide, a carbide, a complex and the like of metal can be used as the metal compound, and it is preferred that a chloride, an oxide or a complex of metal is used as the metal compound.

The shape of the carbon precursor polymer or the compound of the carbon precursor polymer and a metal is not particularly limited as long as the carbon catalyst has activity.

For example, the carbon precursor polymer or the compound of the carbon precursor polymer may have a sheet-like shape, fiber-like shape, block-like shape, particle-like shape or the like.

Next, in the case where a polymer material with poor heat-curing property is used as the carbon precursor polymer, it is possible to perform an infusibilization treatment.

By performing the infusibilization treatment, the structure of the resin can be maintained even under a temperature equal to or higher than the melting point or softening point of the carbon precursor. The infusibilization treatment can be performed using a known method.

The carbon precursor polymer is carbonized by being heated at a temperature of 300° C. to 1500° C., preferably 400° C. to 1200° C., for a holding time of 5 minutes to 180 minutes, preferably 20 minutes to 120 minutes.

At this time, the carbonization may also be performed under a flow of an inert gas such as nitrogen gas. If the carbonization temperature is lower than 300° C., the carbonization performed on the carbon precursor polymer will be insufficient; while if the carbonization temperature is higher than 1500° C., the carbonization will be excessive and therefore catalytic activity will be remarkably reduced.

Further, if the holding time is shorter than 5 minutes, it will be impossible to evenly perform the heat treatment on the carbon precursor polymer; while if the holding time exceeds 180 minutes, catalytic activity will be remarkably reduced.

Further, nitrogen atoms may also be introduced after carbonization.

At this time, the following methods can be used to introduce nitrogen atoms: an ammoxidation method, a liquid-phase doping method, a vapor-phase doping method, or a vapor-liquid-phases doping method. For example, nitrogen atoms can be introduced into the surface of the carbon catalyst by mixing ammonia, melamine, acetonitrile or the like (as a nitrogen source) into the carbon catalyst, and performing a heat treatment on the carbon catalyst by holding the carbon catalyst at a temperature of 550° C. to 1200° C. for 5 minutes to 180 minutes under an inert gas atmosphere, such as an atmosphere of nitrogen, argon, helium or the like.

In the case where the carbon catalyst contains metal, the metal can be removed by performing an acid treatment or electrolytic treatment according to necessity.

There is a case where the metal becomes no longer necessary after the carbonization. In such case, the metal can be removed by performing an acid treatment or electrolytic treatment on the carbon catalyst according to necessity. Particularly, in the case where the carbon catalyst is used as cathode catalyst of a fuel cell, since the metal will be eluted so as to decrease activity for oxygen reduction reaction and deteriorate a solid polymer membrane, it is necessary to remove the metal before use.

The carbon catalyst produced in the aforesaid manner has a catalytic activity of 0.65 V vs. NHE (when current density is $-10\ \mu A/cm^2$) or higher.

The carbon catalyst according to the present invention can be used in various applications.

For example, the carbon catalyst according to the present invention can be used to configure a fuel cell or an electricity storage device (such as a battery, an electric double layer capacitor and the like), or be used as a general catalyst for chemical reaction.

As an application of the carbon catalyst of the present invention, if the carbon catalyst is used to configure a fuel cell, the fuel cell includes a solid electrolyte and two (a pair of) electrode catalysts facing each other with the solid electrolyte interposed therebetween, wherein at least one of the two (a pair of) electrode catalysts uses the carbon catalyst of the present invention.

If the carbon catalyst of the present invention is used to configure an electricity storage device, the electricity storage device includes an electrode material and an electrolyte, wherein the electrode material uses the carbon catalyst of the present invention.

Figure 3:
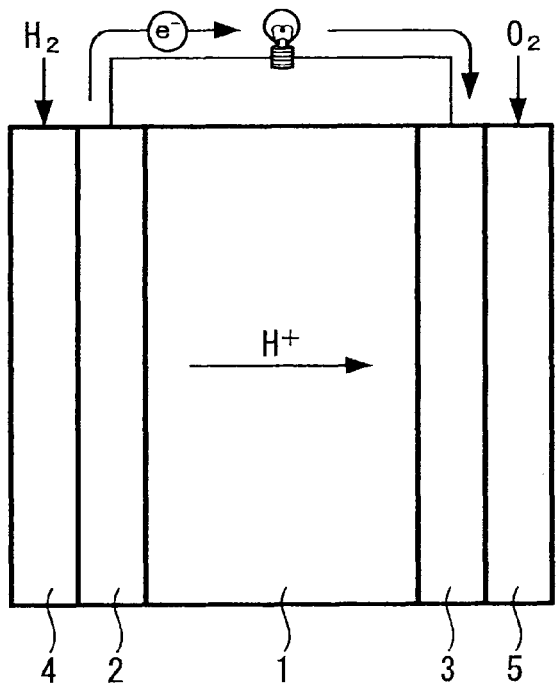
FIG. 3 is a view showing a schematic configuration of an embodiment of a fuel cell according to the present invention.

Here, a schematic configuration of an embodiment of a fuel cell wherein the carbon catalyst is used is shown in FIG. 3.

A fuel cell 10 includes a solid polyelectrolyte 1, a pair of electrode catalyst layers 2, 3, and a pair of supports 4, 5, wherein the pair of electrode catalyst layers 2, 3 face each other with the solid polyelectrolyte 1 interposed therebetween, and the pair of supports 4, 5 face each other with the solid polyelectrolyte 1 and the pair of electrode catalyst layers 2, 3 interposed therebetween. The fuel cell 10 has a configuration of so-called "polymer electrolyte fuel cell (PFEC)".

The electrode catalyst layer 2 on the left side of the drawing is an anode catalyst layer (fuel electrode).

The electrode catalyst layer 3 on the right side of the drawing is a cathode catalyst layer (oxidizer electrode).

The fuel cell 10 can be configured in which the carbon catalyst of the present invention is applied to one or both of the pair of electrode catalyst layers 2, 3.

A fluorine-based cation-exchange resin membrane, represented by a perfluorosulfonic acid resin membrane, can be used as the solid polyelectrolyte 1.

The supports 4, 5 are also adapted to supply and discharge reaction gases such as fuel gas $H_2$, oxidizer gas $O_2$ and the like, in addition to supporting the anode catalyst layer 2 and cathode catalyst 3.

Incidentally, the supports 4, 5 each is typically configured by a separator arranged on outer side and a gas diffusion layer arranged on inner side (i.e., electrolyte side), however the support may be configured by the separator only depending on the nature of the carbon catalyst, without having the gas diffusion layer. For example, if a carbon catalyst having large specific surface area and high gas diffusivity is used as the electrode catalyst layer, since the catalyst layer also functions as gas diffusion layer, it is possible to omit the gas diffusion layer.

The separator can be formed by, for example, a resin having a groove formed therein for passing the reaction gas.

The gas diffusion layer can be formed by, for example, a porous sheet (for example, a carbon paper). The gas diffusion layer also functions as a current collector.

The fuel cell 10 of the present embodiment is configured as described above, and therefore operates in the following manner.

Further, when the reaction gases (i.e., the fuel gas $H_2$ and oxidizer gas $O_2$) are respectively supplied to the anode catalyst layer 2 and the cathode catalyst layer 3, a triphasic interface of a gas phase (the reaction gas), a liquid phase (the solid polyelectrolyte membrane) and a solid phase (the catalyst of the both electrodes) is formed on the border between the carbon catalyst of the electrode catalyst layers 2, 3 and the solid polyelectrolyte 1.

At this time, a DC power is generated due to the occurrence of an electrochemical reaction.

In the aforesaid electrochemical reaction, the following reactions occur on the cathode side and the anode side:

Anode side: $H_2 \rightarrow 2H^+ + 2e^-$

Cathode side: $O_2 + 4H^+ + 4e^- \rightarrow 2H_2O$

The $H^+$ ion generated on the anode side moves toward the cathode side through the solid polyelectrolyte 1, and the $e^-$ (electron) generated on the anode side moves toward the cathode side through an external load.

While on the cathode side, the oxygen contained in the oxidizer gas is reacted with the $H^+$ ion and the $e^-$ moved from the anode side to form water.

As a result, in the fuel cell 10, DC power is generated from hydrogen and oxygen, and meanwhile water is formed.

The fuel cell 10 of the present embodiment can be produced in the same manner as a conventional polymer electrolyte fuel cell (PFEC).

For example, by forming the carbon catalyst of the present invention (as the anode catalyst layer 2 and cathode catalyst layer 3) on both principal surfaces of the solid polyelectrolyte 1 and bringing the carbon catalyst into close contact with the both principal surfaces of the solid polyelectrolyte 1 by hot pressing, these components can be integrated as a MEA (Membrane Electrode Assembly).

With the configuration of the fuel cell 10 of the aforesaid embodiment, since the carbon catalyst having high activity according to the present invention is used in at least one of both the anode catalyst layer 2 and cathode catalyst layer 3, the fuel cell 10 with high performance can be achieved with sufficiently low cost compared with the case where platinum catalyst is used.

The fuel cell 10 of the aforesaid embodiment represents a case where the fuel cell 10 according to the present invention is applied to the polymer electrolyte fuel cell (PFEC).

The fuel cell according to the present invention may also be applied to other kinds of fuel cells as long as the carbon catalyst can be used in these fuel cells, instead of being limited to the polymer electrolyte fuel cell (PFEC).

Figure 4:
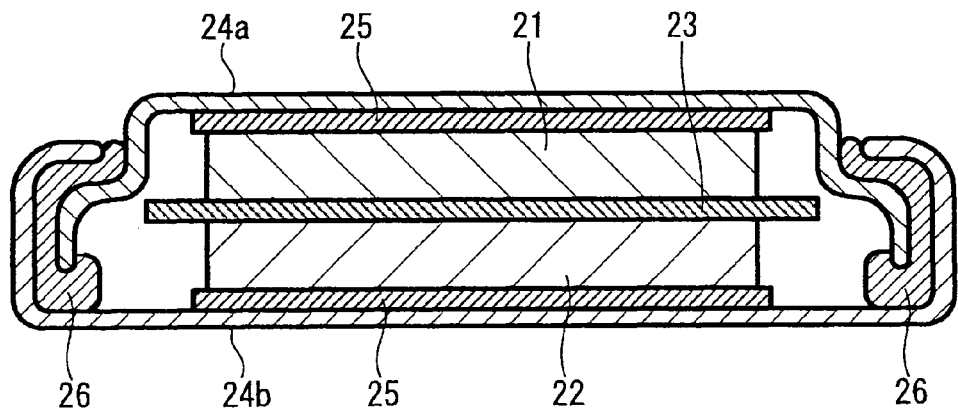
FIG. 4 is a view showing a schematic configuration of an electric double layer capacitor of an embodiment of an electricity storage device according to the present invention.

Next, a schematic configuration of an electric double layer capacitor, as an embodiment of an electricity storage device where the carbon catalyst is used, is shown in FIG. 4.

An electric double layer capacitor 20 includes a first electrode (a polarized electrode) 21, a second electrode (a polarized electrode) 22, a separator 23, an exterior lid 24a and an exterior case 24b, wherein the first electrode 21 and the second electrode 22 face each other with the separator 23 interposed therebetween, and the exterior lid 24a and exterior case 24b accommodate the first electrode 21, the second electrode 22 and the separator 23.

The first electrode 21 and the second electrode 22 are respectively connected to the exterior lid 24a and the exterior case 24b through a current collector 25.

Further, the separator 23 is impregnated with an electrolytic solution.

Further, the exterior lid 24a and the exterior case 24b are sealed to each other by caulking with a gasket 26 interposed therebetween to electrically-insulate the exterior lid 24a and exterior case 24b from each other, and thereby the inside is sealed.

In the electric double layer capacitor 20 of the present embodiment, the carbon catalyst according to the present invention can be applied to the first electrode 21 and/or the second electrode 22. Further, it is possible to configure the electric double layer capacitor having the electrode material to which the carbon catalyst is applied.

The carbon catalyst according to the present invention is electrochemically inactive with respect to the electrolytic solution and has proper electrical conductivity.

Therefore, by applying the carbon catalyst to the electrodes of the capacitor, capacitance per unit volume of the electrodes can be improved.

Further, similar to the aforesaid electric double layer capacitor 20, the carbon catalyst according to the present invention can be applied to other electrodes formed of carbon material, such as negative-electrode material of a lithium-ion secondary battery.

Next, cases where the carbon catalyst is used as an alternative to an environmental catalyst containing a noble metal such as platinum will be described below.

An environmental catalyst configured by a catalyst material formed of a noble metal-based material, such as a platinum-based material, or a compound thereof is used as an exhaust gas purging catalyst for removing contaminated materials (mainly gaseous substances) contained in the contaminated air by performing degradative treatment.

The carbon catalyst according to the present invention can be used as an alternative to the exhaust gas purging catalyst which contains a noble metal such as platinum.

Thus, since the noble metal such as platinum is unnecessary to be used, it is possible to provide a low-cost environmental catalyst. Further, since the specific surface area is large, treatment area (in which the material-to-be-treated is degraded) per unit volume can be increased, and therefore it is possible to configure an environmental catalyst excellent in degradation function per unit volume.

Incidentally, by carrying a noble metal-based material used in a conventional environmental catalyst, such as a platinum-based material, or a compound thereof on the aforesaid carbon catalyst as a carrier, it is possible to configure an environmental catalyst more excellent in catalytic action such as degradation function and the like.

Incidentally, the environmental catalyst having the aforesaid carbon catalyst may also be used as a catalyst for water treatment, in addition to being used as the aforesaid exhaust gas purging catalyst.

The carbon catalyst according to the present invention may also be used as a catalyst for various kinds of general reactions.

Particularly, the carbon catalyst according to the present invention may also be used as an alternative to a generic process catalyst containing noble metal such as platinum used in the chemical industry.

It should be understood that the present invention is not limited to the aforesaid embodiments, but includes various other configurations without departing from the spirit of the present invention.

EXAMPLES

The carbon catalyst having nitrogen introduced therein was actually produced and the characteristics thereof were checked.

Example 1

Preparation of (Nitrogen Compound and Cobalt Compound)-added polyacrylonitrile-polymethacrylic acid copolymer (PAN-Co-PMA)

1.5 g of polyacrylonitrile-polymethacrylic acid copolymer (referred to as "PAN-co-PMA" hereinafter) was dissolved in 20 g of dimethylformamide. Thereafter, 1.5 g of cobalt chloride hexahydrate and 1.5 g of 2-methylimidazole were added, and agitation was performed for 2 hours to obtain a blue solution.

Next, the blue solution was vacuum-dried at a temperature of 60° C. to obtain a (nitrogen compound and cobalt compound)-added PAN-co-PMA.

[Infusibilization Treatment]

Next, an infusibilization treatment was performed.

First, the obtained (nitrogen compound and cobalt compound)-added PAN-co-PMA was set into a forced circulation-type dryer.

Further, under air atmosphere, the temperature was raised from room temperature to 150° C. over 30 minutes, then raised from 150 to 220° C. over 2 hours, and then the temperature was held at 220° C. for 3 hours.

By the above steps, the infusibilization treatment was completed.

[Carbonization Process]

Next, a carbonization process was performed.

First, the (nitrogen compound and cobalt compound)-added PAN-co-PMA having been subjected to the infusibilization treatment was put into a quartz tube to be subjected to nitrogen purge for 20 minutes in an ellipsoidal reflection type infrared gold image furnace and then the temperature was raised from room temperature to 900° C. over 1.5 hours.

Thereafter, the temperature was held at 900° C. for 1 hour.

By the above steps, the carbonization process for the (nitrogen compound and cobalt compound)-added PAN-co-PMA was completed.

[Crushing Process]

A crushing process was performed after performing the carbonization process.

First, the (nitrogen compound and cobalt compound)-added PAN-co-PMA having been subjected to the carbonization process was set in a planetary ball mill (P-7, manufactured by Fritsch), along with zirconia balls having a size of 1.5 mmΦ.

Further, crushing process was performed at a rotational speed of 800 rpm for 5 minutes.

Thereafter, the crushed (nitrogen compound and cobalt compound)-added PAN-co-PMA was taken out from the planetary ball mill and sieved using a sieve having a mesh size of 105 μm. The (nitrogen compound and cobalt compound)-added PAN-co-PMA passed through the sieve was used as a specimen of Example 1.

Example 2

1.5 g of PAN-co-PMA was dissolved in 20 g of dimethylformamide. Thereafter, 0.75 g of cobalt chloride hexahydrate and 0.75 g of 2-methylimidazole were added, and agitation was performed for 2 hours to obtain a blue solution.

Next, the blue solution was vacuum-dried at a temperature of 60° C. to obtain a (nitrogen compound and cobalt compound)-added PAN-co-PMA.

The infusibilization treatment and the steps after the infusibilization treatment described in Example 1 were also performed on the obtained (nitrogen compound and cobalt compound)-added PAN-co-PMA to obtain a carbon catalyst, which was used as a specimen of Example 2.

Example 3

1.5 g of PAN-co-PMA was dissolved in 20 g of dimethylformamide. Thereafter, 1.5 g of cobalt chloride hexahydrate and 0.75 g of 2-methylimidazole were added, and agitation was performed for 2 hours to obtain a blue solution.

Next, the blue solution was vacuum-dried at a temperature of 60° C. to obtain a (nitrogen compound and cobalt compound)-added PAN-co-PMA.

The infusibilization treatment and the steps after the infusibilization treatment described in Example 1 were also performed on the obtained (nitrogen compound and cobalt compound)-added PAN-co-PMA to obtain a carbon catalyst, which was used as a specimen of Example 3.

Example 4

Preparation of Cobalt Compound Added Polybenzimidazole 1.5 g of polybenzimidazole was dissolved in 20 g of dimethylacetamide. Thereafter, 1.5 g of cobalt chloride hexahydrate was added, and agitation was performed for 2 hours to obtain a blue solution.

Next, the blue solution was vacuum-dried at a temperature of 60° C. to obtain a cobalt compound added polybenzimidazole.

[Infusibilization Treatment]

Next, an infusibilization treatment was performed.

First, the obtained cobalt compound added polybenzimidazole was set into a forced circulation-type dryer.

Further, under air atmosphere, the temperature was raised from room temperature to 150° C. over 30 minutes, then raised from 150 to 220° C. over 2 hours, and then the temperature was held at 220° C. for 3 hours.

[Carbonization Process]

Next, a carbonization process was performed.

First, the cobalt compound added polybenzimidazole having been subjected to the infusibilization treatment was put into a quartz tube to be subjected to nitrogen purge for 20 minutes in an ellipsoidal reflection type infrared gold image furnace and then the temperature was raised from room temperature to 900° C. over 1.5 hours.

Thereafter, the temperature was held at 900° C. for 1 hour.

Thus, the cobalt compound added polybenzimidazole was subjected to a carbonization process to obtain the carbon catalyst.

[Nitrogen Introducing Process]

The carbon catalyst obtained by performing the carbonization process was put into a quartz tube to be subjected to a nitrogen gas purge for 20 minutes in an ellipsoidal reflection type infrared gold image furnace, and then the temperature was raised from room temperature to 600° C. over 20 minutes, and then the atmosphere was changed to a mixed gas atmosphere of ammonia and air (ammonia:air=7:3) and temperature was held at 600° C. for two hours to introduce nitrogen.

[Crushing Process]

A crushing process was performed after performing the nitrogen introducing process.

First, the cobalt compound added polybenzimidazole having been subjected to the carbonization process was set in a planetary ball mill (P-7, manufactured by Fritsch), along with zirconia balls having a size of 1.5 mmΦ.

Further, a crushing process was performed at a rotational speed of 800 rpm for 5 minutes.

Thereafter, the crushed cobalt compound added polybenzimidazole was taken out from the planetary ball mill and sieved using a sieve having a mesh size of 105 μm. The cobalt compound added polybenzimidazole passed through the sieve was used as a specimen of Example 4.

Comparative Example 1

Methanol (manufactured by Wako Pure Chemical Industries, Ltd.) 100 ml was mixed with furfuryl alcohol (manufactured by Wako Pure Chemical Industries, Ltd.) 10 g to prepare a mixed solution, and a cobalt phthalocyanine complex (manufactured by Wako Pure Chemical Industries, Ltd.) 2.090 g and melamine (manufactured by Wako Pure Chemical Industries, Ltd.) 7.499 g were added into the mixed solution, and the mixture was stirred at room temperature for one hour with a magnetic stirrer.

The solvent was removed with a rotary evaporator at 60° C. while irradiating ultrasonic waves to the mixture.

Thereafter, the resultant was moved to a dish under a nitrogen gas atmosphere of a pressure of 0.1 MPa and a temperature of 80° C. and maintained for 24 hours, so that a polymerization reaction occurred to synthesize a polyfurfuryl alcohol (carbon precursor polymer) containing a cobalt phthalocyanine complex and melamine.

The carbonization process and the steps after the carbonization process described in Example 1 were also performed on the obtained carbon precursor polymer to obtain a carbon catalyst, which was used as a specimen of Comparative Example 1.

Comparative Example 2

Further, nitrogen was introduced by an ammoxidation method, using the carbon catalyst obtained in Comparative Example 1.

The carbon catalyst obtained in Comparative Example 1 was put into a quartz tube to be subjected to a nitrogen gas purge for 20 minutes in an ellipsoidal reflection type infrared gold image furnace, and then the temperature was raised from room temperature to 600° C. over 20 minutes, and then the atmosphere was changed to a mixed gas atmosphere of ammonia and air (ammonia:air=7:3) and temperature was held at 600° C. for two hours.

The carbon catalyst obtained in such a manner was used as a specimen of Comparative Example 2.

Comparative Example 3

Ketjen Black EC600JD (manufactured by Lion Corporation), which is a high conductive carbon material, was used as a specimen of Comparative Example 3.

Comparative Example 4

Further, nitrogen was introduced into Ketjen Black EC600JD (manufactured by Lion Corporation) by an ammoxidation method.

To be specific, Ketjen Black EC600JD was put into a quartz tube to be subjected to a nitrogen gas purge for 20 minutes in an ellipsoidal reflection type infrared gold image furnace, and then the temperature was raised from room temperature to 600° C. over 20 minutes, and then the atmosphere was changed to a mixed gas atmosphere of ammonia and air (ammonia:air=7:3) and temperature was held at 600° C. for two hours.

In such a manner, a specimen of Comparative Example 4 was produced.

Comparative Example 5

Vulcan XC-72R (manufactured by Electrochem), which is a high conductive carbon material, was used as a specimen of Comparative Example 5.

Comparative Example 6

Further, nitrogen was introduced into Vulcan XC-72R (manufactured by Electrochem) by an ammoxidation method.

To be specific, Vulcan XC-72R was put into a quartz tube to be subjected to a nitrogen gas purge for 20 minutes in an ellipsoidal reflection type infrared gold image furnace, and then the temperature was raised from room temperature to 600° C. over 20 minutes, and then the atmosphere was changed to a mixed gas atmosphere of ammonia and air (ammonia:air=7: 3) and temperature was held at 600° C. for two hours.

In such a manner, a specimen of Comparative Example 6 was produced.

<Characteristic Evaluation>

Characteristics of the produced specimen of each of the aforesaid examples and comparative examples were measured as described below.

(X-ray Photoelectron Spectroscopy (XPS))

XPS measurement was performed on each specimen using an ESCA 5600 (manufactured by Perkin Elmer).

(Ratio of Nitrogen Atoms to Carbon Atoms on the Surface)

Surface elemental concentration of nitrogen, carbon and oxygen was obtained based on each peak area of the spectrum obtained by performing XPS measurement and detection sensitivity coefficient, and the value of the ratio of nitrogen atoms to carbon atoms on the surface (i.e., the value of nitrogen/carbon) was calculated based on the obtained surface elemental concentration of nitrogen, carbon and oxygen.

((First Nitrogen Atom)/(Second Nitrogen Atom))

Peak area ratio (i.e., (first nitrogen atom)/(second nitrogen atom)) was calculated based on each peak area of the spectrum obtained by performing XPS measurement.

(Test of Electrode Activity Associated with Oxygen Reduction)

Electrode activity associated with oxygen reduction was measured using a three-electrode cell.

Further, a voltammogram (which represents a relationship between potential and current density as shown in FIG. 2) was plotted based on the electrode activity obtained by measurement.

Further, based on the voltammogram, potential at a current density of $-10^{-2}$ mA/cm$^2$ was obtained as Eo2, and a reduction current density at a potential of 0.7 V vs. NHE was obtained as the value of activity for oxygen reduction reaction.

As measurement results of each specimen, the Eo2, the value of activity for oxygen reduction reaction, the ratio of nitrogen atom to carbon atom on the surface, and the ratio of the first nitrogen atom to the second nitrogen atom are indicated in Table 1.

TABLE 1

| | Eo2 (Vvs. NHE) | Value of activity for oxygen reduction reaction (mA/cm$^2$) | Nitrogen/ Carbon | (First nitrogen atom)/ Second nitrogen atom) |
|---|---|---|---|---|
| Example 1 | 0.800 | −0.431 | 0.049 | 0.65 |
| Example 2 | 0.781 | −0.210 | 0.019 | 1.11 |
| Example 3 | 0.762 | −0.356 | 0.036 | 0.82 |
| Example 4 | 0.729 | −0.167 | 0.076 | 1.16 |
| Comparative Example 1 | 0.602 | −0.008 | 0.008 | 1.26 |
| Comparative Example 2 | 0.636 | −0.010 | 0.016 | 1.23 |
| Comparative Example 3 | 0.260 | No current value | 0.000 | — |
| Comparative Example 4 | 0.301 | −0.001 | 0.026 | 1.78 |
| Comparative Example 5 | 0.221 | No current value | 0.000 | — |
| Comparative Example 6 | 0.265 | −0.002 | 0.046 | 1.42 |

—: Since content of nitrogen is out of detection limit, calculation is impossible It can be known from FIG. 2 that, compared with the carbon catalyst having low activity, the carbon catalyst having high activity has large Eo2 and large value of activity for oxygen reduction reaction (i.e., the absolute value of current density at a certain potential).

It can be known from Table 1 that, compared with the specimen of each of comparative examples, the specimen of each of Example 1 to Example 4 has large Eo2 and large value of activity for oxygen reduction reaction, and has high activity.

It can be known from Table 1 that the specimen of Example 1 not only has large ratio of nitrogen atoms to carbon atoms on the surface, but also has a ratio of the first nitrogen atom to the second nitrogen atom of 0.65, which is sufficiently small value compared with the specimen of each of comparative examples.

Further, the specimens of Example 2, Example 3 and Example 4 not only have large ratio of nitrogen atoms to carbon atoms on the surface, but also have a ratio of the first nitrogen atom to the second nitrogen atom of 1.11, 0.82 and 1.16, which are smaller than that of the specimen of each of comparative examples.

Further, in the case of Example 1 to Example 3, the catalyst was caused only by nitrogen contained in the starting material, while in the case of Example 4, nitrogen was further introduced after carbonization, however high nitrogen content and activity can be obtained in the both cases.

On the other hand, it is known from the result of Comparative Example 3 and Comparative Example 5 that activity will be low if nitrogen is not introduced.

Further, it is known from the result of Comparative Example 2, Comparative Example 4 and Comparative Example 6 that, compared with the case where nitrogen is not introduced, the case where nitrogen is introduced has improved activity, however high activity like the case of Example 1 can not be achieved by simply introducing nitrogen.

In the case of the specimen of Comparative Example 6, the ratio of nitrogen atoms to carbon atoms on the surface is large, however the ratio of the first nitrogen atom to the second nitrogen atom is 1.42, which is a large value, and the Eo2 and value of activity for oxygen reduction reaction are far smaller than those of the specimen of Example 1.

This means that simply increasing introduced nitrogen atoms does not necessarily improve activity.

Thus, as the specimen of each of examples, high activity can be achieved by a configuration in which not only the ratio of nitrogen atoms to carbon atoms on the surface is large, but also the ratio of the first nitrogen atom to the second nitrogen atom is small.

EXPLANATION OF REFERENCE NUMERALS

1 Solid polyelectrolyte
2 Anode catalyst layer (fuel electrode)
3 Cathode catalyst layer (oxidizer electrode)
4, 5 Support
10 Fuel cell
20 Electric double layer capacitor
21 First electrode
22 Second electrode
23 Separator
24a Exterior lid
24b Exterior case
25 Current collector
26 Gasket

The invention claimed is:

1. A method for producing a nitrogen-comprising carbon catalyst, the method comprising:
preparing a carbon precursor polymer with a polyacrylonitrile-polymethacrylic acid copolymer;
mixing at least one transition metal or a compound comprising the at least one transition metal, a nitrogen-comprising carbon precursor compound, and the carbon precursor polymer, thereby obtaining a mixture; and
carbonizing the mixture, thereby obtaining the nitrogen-comprising carbon catalyst
wherein the at least one transition metal is selected from the group consisting of cobalt (Co), iron (Fe), manganese (Mn), nickel (Ni), copper (Cu), titanium (Ti), chromium (Cr), zinc (Zn), zirconium (Zr), and tantalum (Ta),
an energy peak area ratio of a first nitrogen atom whose electron in an 1s orbital has a binding energy of 398.5±1.0 eV to a second nitrogen atom whose electron in an 1s orbital has a binding energy of 401±1.0 eV, i.e., a value of (the first nitrogen atom)/(the second nitrogen atom), is 1.2 or less, and
an atomic ratio of nitrogen atoms on a surface of the catalyst to carbon atoms on the surface is from 0.01 to 0.3.

2. The method according to claim 1, wherein the nitrogen-comprising carbon precursor compound is an imidazole.

3. A method for producing a nitrogen-comprising carbon catalyst, the method comprising:
preparing a carbon precursor polymer with a polybenzimidazole;
mixing at least one transition metal or a compound comprising the at least one transition metal and the carbon precursor polymer, thereby obtaining a first mixture;
carbonizing the first mixture, thereby obtaining a carbonized mixture; and
adding nitrogen into the carbonized mixture, thereby obtaining the nitrogen-comprising carbon catalyst,
wherein the at least one transition metal is selected from the group consisting of cobalt (Co), iron (Fe), manganese (Mn), nickel (Ni), copper (Cu), titanium (Ti), chromium (Cr), zinc (Zn), zirconium (Zr), and tantalum (Ta),
an energy peak area ratio of a first nitrogen atom whose electron in an 1s orbital has a binding energy of 398.5±1.0 eV to a second nitrogen atom whose electron in an 1s orbital has a binding energy of 401±1.0 eV, i.e., a value of (the first nitrogen atom)/(the second nitrogen atom), is 1.2 or less, and
an atomic ratio of nitrogen atoms on a surface of the catalyst to carbon atoms on the surface is from 0.01 to 0.3.

* * * * *